(12) United States Patent
Ganzel et al.

(10) Patent No.: US 12,420,766 B2
(45) Date of Patent: Sep. 23, 2025

(54) ELECTROMECHANICAL BRAKE PRESSURE GENERATOR UNIT

(71) Applicants: ZF Active Safety US Inc., Livonia, MI (US); ZF Active Safety GmbH, Koblenz (DE)

(72) Inventors: Blaise Ganzel, Ann Arbor, MI (US); Frank Einig, Ochtendung (DE); Klaus Lemke, Hanroth (DE); Iosu Oloriz del Rosario, Koblenz (DE); Paul Warkentin, Bonefeld (DE); Martin Hofmann, Mendig (DE); Karl-Josef Adams, Muenstermaifeld (DE)

(73) Assignees: ZF ACTIVE SAFETY GMBH, Koblenz (DE); ZF ACTIVE SAFETY US INC., Livonia, MI (US)

( * ) Notice: Subject to any disclaimer, the term of this patent is extended or adjusted under 35 U.S.C. 154(b) by 391 days.

(21) Appl. No.: 18/119,553

(22) Filed: Mar. 9, 2023

(65) Prior Publication Data

US 2024/0300466 A1   Sep. 12, 2024

(51) Int. Cl.
*B60T 13/74* (2006.01)
*B60T 7/04* (2006.01)

(52) U.S. Cl.
CPC ............ *B60T 13/745* (2013.01); *B60T 7/042* (2013.01)

(58) Field of Classification Search
CPC ............................... B60T 13/745; B60T 7/042
USPC ................................................... 188/156–164
See application file for complete search history.

(56) References Cited

U.S. PATENT DOCUMENTS

| 2017/0130792 | A1* | 5/2017 | Tandler | ................. B60T 13/741 |
| 2020/0340563 | A1* | 10/2020 | Boehm | ................. B60T 8/3255 |
| 2023/0070222 | A1* | 3/2023 | Nagel | ..................... B60T 7/042 |

FOREIGN PATENT DOCUMENTS

| DE | 102014214653 A1 | 3/2015 | |
| JP | 2017096313 A * | 6/2017 | ............. F16H 25/22 |

OTHER PUBLICATIONS

Search Report of the corresponding German patent application dated Jan. 24, 2025, pp. 1-8.

\* cited by examiner

*Primary Examiner* — Christopher P Schwartz
(74) *Attorney, Agent, or Firm* — Tarolli, Sundheim, Covell &Tummino LLP

(57) ABSTRACT

An electromechanical brake pressure generator unit (10) of a brake-by-wire brake system can only be activated electronically and comprises a master brake cylinder (20), an electric motor (14) and a multi-stage intermediate transmission (16). A spindle-nut unit (18) comprises a nut (40) having a centring surface (42) by way of which the piston (48) of the master brake cylinder (20) is centred.

11 Claims, 2 Drawing Sheets

ELECTROMECHANICAL BRAKE PRESSURE GENERATOR UNIT

TECHNICAL FIELD

The invention relates to an electromechanical brake pressure generator unit of a brake-by-wire brake system, wherein the brake pressure generator unit can only be activated electronically.

BACKGROUND

A brake pressure generator unit ensures that brake pressure is present at the hydraulic brake cylinders.

Brake boosters are usually part of a brake pressure generator unit, the brake pressure generated by the brake pedal being boosted in the brake boosters. Such brake boosters can be, for example, in the form of vacuum brake boosters or in the form of hydraulic brake boosters, which work with a hydraulic pump.

However, the present invention relates to a brake pressure generator unit of a brake-by-wire brake system. Such brake systems, for which the brake pressure generator unit according to the invention explained hereinbelow is also used, do not have a mechanical coupling between the brake pedal and the brake piston in the event of failure of the electrics. The brake pressure generator unit can thus only be activated electronically.

SUMMARY

The object of the invention is to design such an electromechanical brake pressure generator unit as compactly as possible.

The electromechanical brake pressure generator unit according to the invention is part of a brake-by-wire brake system and can only be activated electronically. It comprises a master brake cylinder for generating a hydraulic pressure for at least one hydraulic brake circuit, preferably at least two separate hydraulic brake circuits, an electric motor, an intermediate transmission driven by the electric motor, and a spindle-nut unit having a spindle which can be driven by the intermediate transmission and a nut which is mounted in a rotationally fixed manner and can be displaced axially by the spindle, wherein the nut axially displaces a piston which is displaceable in the master brake cylinder.

The compact construction of the motor is achieved by the intermediate transmission, by way of which the torque of the motor is increased, namely to a degree that is required by the spindle in order to generate the required hydraulic pressure. The electric motor can accordingly be designed so that it is more compact and less high-torque.

The spindle can have an axis of rotation and the motor can have a motor axis which lie parallel to one another. The motor is thus arranged at the side of the spindle, which ensures a construction which is very compact in particular axially. The motor can also be moved radially very close to the spindle so as to require little installation space in that dimension.

A multi-stage gearwheel transmission ensures robust torque transfer and especially a desired high reduction ratio.

This multi-stage gear transmission is preferably provided axially at the side of the electric motor and also axially at the side of the spindle, so that the brake pressure generator unit, when viewed from the side, has a U-shape, the parallel legs of which are formed by the electric motor on the one hand and by the spindle-nut unit on the other hand, and the connecting flange of which is formed by the intermediate transmission. This spatial decoupling is also advantageous in respect of the mounting and dismantling of the individual assemblies.

A further improvement in compactness can be achieved by positioning a control unit, with which the electric motor is coupled in terms of control, adjacent to the electric motor and at the side of the spindle and/or the piston. In this context, the control unit may also be coupled directly to the electric motor, for example to the end face of the electric motor that is opposite the transmission.

Mounting of the nut in turn takes place, for example, by way of a rotation-blocking element, to which the nut is also fastened.

This rotation-blocking element can be displaceably mounted on guide rods and also centred thereon. The guide rods thus have a dual function. By centring the rotation-blocking element, they also centre the nut, which is fastened to the rotation-blocking element. Two or more guide rods additionally prevent the rotation-blocking element from tipping, whereby the movement of the nut relative to the spindle and also the movement of the nut along the guide rods can be optimized and of low friction.

The guide rods can also be assigned further functions. Thus, according to one variant, they are at the same time also the holders for the master brake cylinder, that is to say they carry the master brake cylinder.

The centring of further parts is possible in a simple mechanical manner in that a centring part, in particular a centring sleeve, is adjacent to the nut, wherein the centring part is seated axially between the nut and the piston and centres the piston relative to the nut. The piston of the master brake cylinder protrudes from the master brake cylinder and its free end on the drive side is centred on the nut with the interposition of the centring part. Thus, the piston is seated optimally in the master brake cylinder, which, as mentioned, could also be mounted by the guide rods.

One variant provides that the centring part and the nut are aligned radially relative to one another by way of a convex, in particular spherical-segment-shaped, centring surface and a complementary concave centring surface abutting thereon. For example, the nut has on its end face a convex centring surface which projects into a complementary concave centring surface on the opposing end face of the centring part. The centring surface on the centring part consequently moves relative to the centring surface on the nut and is aligned relative thereto.

The nut and the centring part do not have to be screwed together or fastened to one another in another way. It is sufficient to exert an axial pressure on the centring surfaces. Radial fastening of the parts takes place by the interlocking connection of the two complementary centring surfaces.

In an axial direction, namely in the direction towards the master brake cylinder, the required axial force introduction takes place by way of the spindle, and one or more return springs act in the opposite direction.

The brake pressure generator unit according to the invention is further very compact because, for mounting on the vehicle, the spindle is radially and axially mounted on a holding part by way of a fixed bearing. The brake pressure generator unit can then be screwed to the vehicle, for example to the bulkhead, by way of the holding part. The fixed bearing is in particular a ball bearing.

The holding part can be in the form of a simple support plate, which is optionally plastically deformed at certain points, for example by deep drawing.

A further option of the invention provides that the spindle is shielded from the environment between the master brake cylinder and the support plate by a housing. The ingress of dirt into the region of the spindle-nut unit and the piston of the master brake cylinder is thus excluded.

The invention relates further to a vehicle brake system which is a brake-by-wire brake system and is equipped with a brake pressure generator unit according to the invention.

BRIEF DESCRIPTION OF THE DRAWINGS

Further features and advantages of the invention will become apparent from the following description and from the following drawings, to which reference is made. In the drawings.

DESCRIPTION

Figure 1:
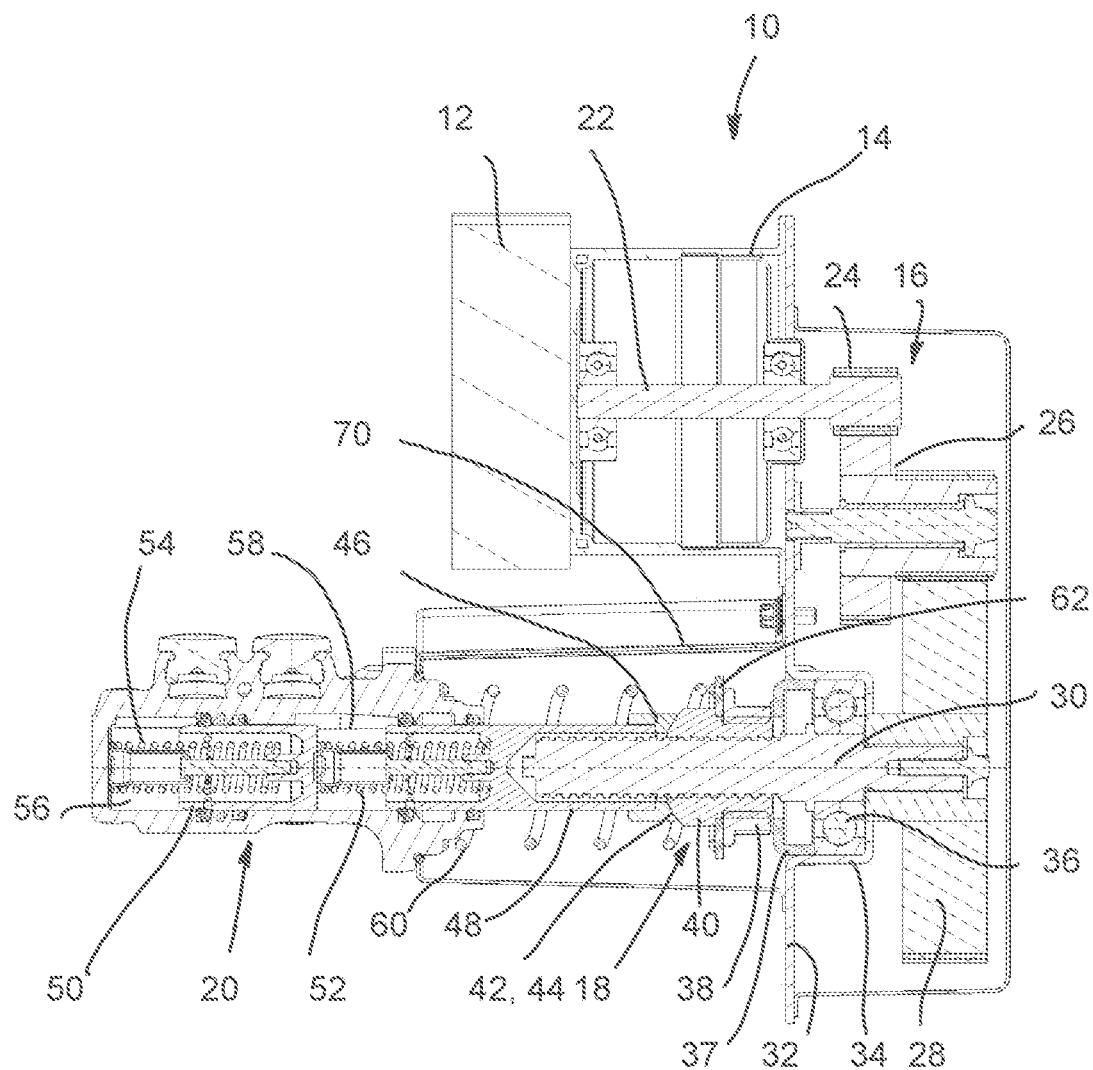
FIG. 1 is a longitudinal sectional view through a variant of the electromechanical brake pressure generator unit according to the invention.

FIG. 1 shows a generally U-shaped electromechanical brake pressure generator unit 10 of a brake-by-wire brake system, which can only be activated electronically, that is to say has no mechanical or pneumatic coupling to the position of a brake pedal.

The brake pressure generator unit 10 comprises a plurality of assemblies, namely a controller 12, an electric motor 14 to which the controller 12 is fastened at a front end, a multi-stage intermediate transmission 16, a spindle-nut unit 18 and a master brake cylinder 20.

The electric motor 14 has a drive shaft 22 which is connected to a pinion 24. The pinion 24 meshes with a first double gearwheel 26, and this meshes with a gearwheel 28 which is mounted in a rotationally fixed manner on a spindle 30 of the spindle-nut unit 18. The motor axis of the electric motor 14 runs parallel to the spindle axis.

A holding part 32 in the form of a support plate serves to hold the brake pressure generator unit 10 and for fastening to a bulkhead (not shown).

The plate-like holding part 32 has a recess 34 which is cup-shaped and accommodates a fixed bearing 36, here in the form of a ball bearing. The recess 34 forms in an axial direction the stop for the outer ring of the ball bearing, in the opposite direction there is provided for this purpose a disc or sleeve 37 which bears axially against a union nut 38 which is screwed to a nut 40 of the spindle 30.

The inner ring of the fixed bearing 36 is axially positioned on one side on a radial prolongation of the spindle 30 and on the opposite side by the gearwheel 28, which in the present example, which is not to be interpreted as being limiting, is in two-part form. The gearwheel 28 has a ring having the toothing and an internal sleeve, connected to the ring, which is pressed axially against the inner ring of the fixed bearing 36 by way of a screw.

On its end face opposite the fixed bearing 36, the nut 40 has a convex, spherical-segment-shaped centring surface 42 which engages into a complementary, concave centring surface 44 of a sleeve-like centring part 46. At its opposite axial end with respect to the nut 40, the centring part 46 has a radial recess in which a piston 48, which is part of the master brake cylinder system, is accommodated and centred. The piston 48 has at its end face a blind hole into which the spindle 30 projects.

By way of the centring part 46, the piston 48 is centred relative to the nut 40.

The piston 48 projects into the housing forming the cylinder and is in the form of a tandem master brake cylinder. This means that, in the event of failure of one brake circuit, the other brake circuit is still capable of functioning. The master brake cylinder 20 thus supplies two independent hydraulic circuits of the vehicle brake system. Corresponding connections have been omitted here.

In FIG. 1, the piston 48 is the piston of the tandem master brake cylinder that is at the rear and, in the embodiment variant shown, is spaced apart from a front piston 50. A return spring 52 is arranged between the piston 50 and the piston 48, and a further return spring 54 is arranged between the piston 50 and a front end of the master brake cylinder. The piston 50 thus defines a first hydraulic chamber 56 and the two pistons 48 and 50 define between them a second hydraulic chamber 58.

A return spring 60, which extends around the piston 48, is provided to move the axially movable nut 40 back into a starting position shown in FIG. 1, for example in the event of failure of the motor 14.

The spindle-nut unit 18 may also be in the form of a recirculating ball spindle-nut unit.

In order to achieve the axial movement of the nut 40, the nut must be secured against rotation. Securing against rotation is achieved by a rotation-blocking element 62, which is clamped between the union nut 38 and a shoulder in the nut 40.

The rotation-blocking element 62 is a plate with an opening which is matched in terms of its diameter to the corresponding diameter in the region of the nut 40, so that the nut 40 fits precisely in the opening.

Figure 2:
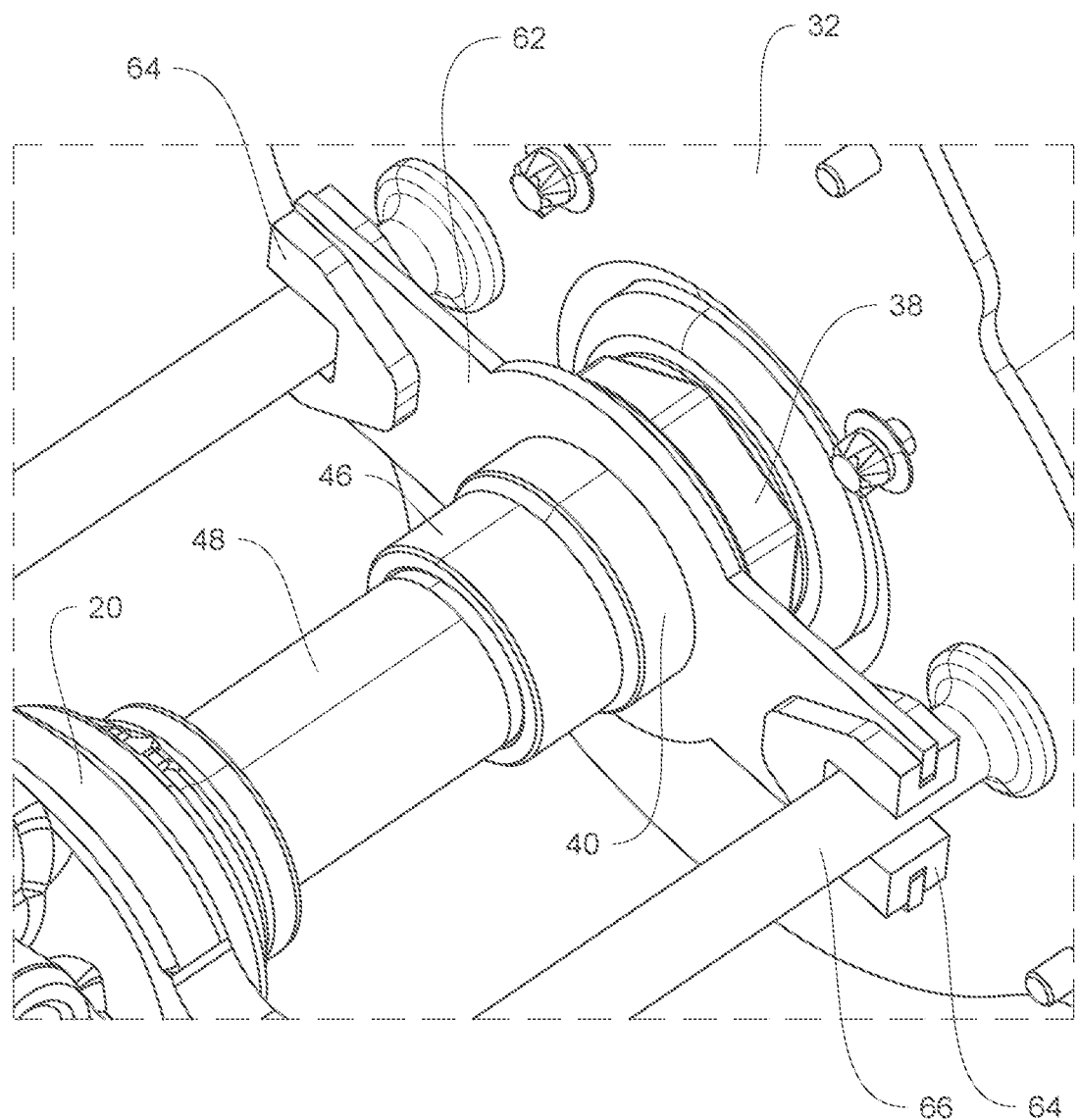
FIG. 2 is a perspective view of a detail of the brake pressure generator unit of FIG. 1 in the region of the piston and the nut.

FIG. 2 shows the plate-like rotation-blocking element 62 between the union nut 38 and the nut 40. The rotation-blocking element 62 is prevented from rotating by two parallel guide rods 66, wherein the guide rods 66 lie on diametrically opposite sides relative to the notional centre axis of the piston 48 and of the spindle 30. The guide rods 66 also run parallel to one another and to this notional centre axis. The guide rods 66 are fastened to the holding part 32.

The rotation-blocking element 62 has at each diametrically oppositely aligned end an opening in the form of a slot, through which the associated guide rod 66 then passes.

A bearing 68, for example an elastomeric bearing, is provided in this region on the rotation-blocking element 62. The bearing of the nut 40 relative to the guide rods 66 that is thus obtained, and its centring relative thereto, is preferably without play. The guide rods 66 thus centre the nut 40 and, by way of the centring element 46, also the piston 48.

The guide rods 66 also fasten the master brake cylinder 20 to the holding part 32.

For sealing the spindle-nut unit 18 with respect to the environment there is provided a housing 70 (see FIG. 1), which correspondingly surrounds not only the spindle-nut unit 18 but also the guide rods 66. This housing 70 is fastened to the holding part 32 and, at the opposite end, to the master brake cylinder 20.

The functioning of the brake pressure generator will be described hereinbelow.

The brake pedal position and the brake pressure are detected by means of corresponding sensors, which evaluate the correspondingly recorded values. In the control unit 12, corresponding signals are provided for the electric motor 14, and the electric motor is activated so that it rotates more or less quickly and for a more or less long time. The applied torque is increased by way of the two-stage gearwheel transmission 16, so that a high torque is present at the spindle 30. The spindle 30 rotates, and the nut 40 thus travels in the direction towards the master brake cylinder 20 and thus displaces the piston 48 into the master brake cylinder, which leads to a pressure rise in the two hydraulic chambers 56, 58, since the piston 50 is also moved at the same time.

If the brake pedal is released, the motor stops or it rotates in the opposite direction, in any case the nut 40 then moves (by means of the electric motor 14 or solely by means of the return spring 60) back into its starting position. The pistons 48, 50 likewise travel back owing to the return springs 52, 54.

The U-shape of the brake pressure generator unit 10 is achieved in that the drive shaft 22 runs parallel to and at the side of the spindle 30 and the piston 48 and is located very close to them. The electric motor 14, together with the control unit 22, is thus arranged at the side of and very close to the master brake cylinder 20 and the spindle-nut unit 18. The intermediate transmission 16 connects these units together and closes the U.

The invention claimed is:

1. Electromechanical brake pressure generator unit of a brake-by-wire brake system, wherein the brake pressure generator unit (10) can only be activated electronically, having a master brake cylinder (20) for generating a hydraulic pressure for at least one hydraulic brake circuit, an electric motor (14), an intermediate transmission (16) driven by the electric motor (14), and a spindle-nut unit (18) having a spindle (30) which can be driven by the intermediate transmission (16) and a nut (40) which is mounted in a rotationally fixed manner and can be displaced axially by the spindle (30), wherein the nut (40) axially displaces a piston (48) which is displaceable in the master brake cylinder (20).

2. Brake pressure generator unit according to claim 1, wherein the spindle (30) has an axis of rotation and the electric motor (14) has a motor axis which lie parallel to one another, wherein the electric motor (14) is arranged at the side of the spindle (30).

3. Brake pressure generator unit according to claim 1, wherein the intermediate transmission (16) is a multi-stage gearwheel transmission.

4. Brake pressure generator unit according to claim 1, wherein the electric motor (14) is coupled with a control unit (12) which is seated adjacent to the electric motor (14) and at the side of the spindle (30) and/or the piston (48).

5. Brake pressure generator unit according to claim 4, wherein mounting of the nut (40) takes place by way of a rotation-blocking element (62) to which the nut (40) is fastened.

6. Brake pressure generator unit according to claim 5, wherein the rotation-blocking element (62) is displaceably mounted and centred on guide rods (66).

7. Brake pressure generator unit according to claim 6, wherein the guide rods (66) are holders for the master brake cylinder (20).

8. Brake pressure generator unit according to claim 1, wherein there is a centring part (46), in particular a centring sleeve, adjacent to the nut (40), which centring part is seated axially between the nut (40) and the piston (48) and centres the piston (48) relative to the nut (40).

9. Brake pressure generator unit according to claim 8, wherein the centring part (46) and the nut (40) are radially aligned relative to one another by way of a convex, in particular spherical-segment-shaped, centring surface (42) and a complementary concave centring surface (44) abutting thereon.

10. Brake pressure generator unit according to claim 1, wherein the spindle (30) is radially and axially mounted on a holding part (32) by way of a fixed bearing (36).

11. Vehicle brake system, wherein the vehicle brake system is a brake-by-wire brake system and is equipped with a brake pressure generator unit (10) according to claim 1.

* * * * *